US007022804B2

(12) United States Patent
Miskovic et al.

(10) Patent No.: US 7,022,804 B2
(45) Date of Patent: Apr. 4, 2006

(54) MOISTURE-CROSSLINKABLE HOT-MELT ADHESIVE BASED ON POLYURETHANE PREPOLYMER

(75) Inventors: Michel Miskovic, Compiegne (FR); François Bauduin, Margny-les-Compiegne (FR); Patrick Bouttefort, Margny-les-Compiegne (FR); Jean-François Chartrel, Cuts (FR)

(73) Assignee: Bostik SA, Paris (FR)

( * ) Notice: Subject to any disclaimer, the term of this patent is extended or adjusted under 35 U.S.C. 154(b) by 0 days.

(21) Appl. No.: 10/453,694

(22) Filed: Jun. 4, 2003

(65) Prior Publication Data

US 2003/0208025 A1 Nov. 6, 2003

Related U.S. Application Data

(63) Continuation of application No. 09/622,126, filed as application No. PCT/FR98/02763 on Dec. 17, 1998, now abandoned.

(30) Foreign Application Priority Data

Dec. 19, 1997 (FR) .................................. 97 16202

(51) Int. Cl.
*C08G 18/10* (2006.01)

(52) U.S. Cl. ............................ 528/59; 528/73; 528/83; 528/905; 156/331.1; 604/389

(58) Field of Classification Search .................. 528/59, 528/73, 83, 905; 156/331.1; 604/389
See application file for complete search history.

(56) References Cited

U.S. PATENT DOCUMENTS

| | | | | |
|---|---|---|---|---|
| 5,176,670 | A | | 1/1993 | Roessler et al. |
| 5,508,111 | A | * | 4/1996 | Schmucker .............. 428/423.1 |
| 5,959,023 | A | | 9/1999 | Wolf |

FOREIGN PATENT DOCUMENTS

| | | | |
|---|---|---|---|
| CA | 2 122 942 | | 6/1995 |
| CA | 2122942 | * | 6/1995 |
| DE | 196 46 879 | | 5/1997 |
| EP | 0 152 497 | | 5/1997 |
| EP | 0 823 446 | | 2/1998 |
| JP | 04 008786 | | 1/1992 |

* cited by examiner

*Primary Examiner*—Rachel Gorr
(74) *Attorney, Agent, or Firm*—Hunton & Williams LLP

(57) ABSTRACT

The invention relates to a moisture-crosslinkable hot-melt adhesive which is composed of a polyurethane prepolymer obtained by polyaddition of at least one polyol to at least one isocyanate chosen from the group of diisocyanates trimerized as isocyanurates and reaction products of diisocyanates with water, the prepolymer having a content of free NCO group of between 1 and 25% by weight. The adhesive according to the invention may be used for the adhesive bonding of fixing components of the Velcro® type to articles intended for hygiene.

16 Claims, No Drawings

MOISTURE-CROSSLINKABLE HOT-MELT ADHESIVE BASED ON POLYURETHANE PREPOLYMER

This is a continuation of U.S. application Ser. No. 09/622,126, filed Aug. 11, 2000 and now abandoned.

The invention relates to a moisture-crosslinkable hot-melt adhesive based on polyurethane prepolymer which can be used in particular in the field of hygiene.

It is now commonplace to use fixing systems of the VELCRO® type to prepare disposable articles relating to the field of hygiene, in particular nappies for babies or incontinent adults and female hygiene articles. It is well known that the systems of the abovementioned type contain two components: a first component composed of a multitude of fine hooks and a second component composed of a multitude of fine loops. By simply pressing on the superimposed components, the hooks are made to enter the loops, which makes it possible to obtain a solid assembly. The bonding between the two components can be broken by the application of a sufficient force. The two components can be assembled and separated several times without a significant decrease in the strength of the assembly.

In the specific case of disposable nappies, these fixing systems are arranged on the rear and front parts forming the belt of the nappy when it is worn by the user (see U.S. Pat. No. 5,176,670).

The component containing the loops is fixed to the front part of the nappy, the loops being directed outwards. This component is generally composed of a thin material based on polyolefin fibres or on other synthetic fibres, in particular a knitted fabric (also known as textile mesh). The component is generally provided in the form of a strip of variable size, optionally decorated with patterns, which is adhesively bonded to the outer covering of the nappy. This covering can consist of a film which is impermeable to liquids, for example a polyethylene or polypropylene film, or of a non-woven which is impermeable to liquids and permeable to vapour.

The adhesive bonding of the component containing the loops to the impermeable material can be carried out by means of thermoplastic adhesives of the type of polyolefins or urethanes (see CA-A 2,122,942) or of moisture-crosslinkable polyurethane adhesives.

The adhesive bonding is carried out industrially at a high rate, that is to say at a speed which can exceed 150 metres per minute. The adhesive-bonding devices operate by coating the impermeable material with the liquid adhesive, for example with a lip nozzle. The component containing the loops is laminated on the impermeable film and the assembly thus formed is calendered and wound off.

The amount of adhesive deposited must be carefully controlled: an excessively low amount will not make possible satisfactory adhesive bonding and an excessively high amount passes through the pores of the laminated component, with the risk of spreading over the loops, which is harmful to the fixing of the component containing the hooks.

It is economically advantageous to seek to limit the amount of adhesive deposited on the impermeable film while maintaining both the performance of the adhesive bonding and the high rate appropriate for industrial adhesive bonding.

The adhesive must in addition fulfil conditions related to the specific use in the field of human hygiene. It must in particular exhibit a substantially zero creep at the body temperature of the user and have a toxicity which is as low as possible. Thus, in the case of polyurethane-based adhesives, a content of free isocyanate monomer of less than 0.15% by weight of the adhesive is generally accepted.

The Applicant Company has now found a novel adhesive which makes it possible to overcome these disadvantages.

The invention relates to a moisture-crosslinkable hot-melt adhesive which is composed of a polyurethane prepolymer obtained by polyaddition of at least one polyol to at least one isocyanate chosen from the group of diisocyanates trimerized as isocyanurates and reaction products of diisocyanates with water, the said prepolymer having a content of free NCO groups of between 1 and 25% by weight, preferably 2 and 15% by weight.

The moisture-crosslinkable hot-melt adhesive is advantageously obtained by polyaddition of at least one polyol to at least one isocyanate chosen from diisocyanates trimerized as isocyanurates.

The polyol is generally chosen from polyether polyols, polyester polyols and unsaturated polyols.

The polyether polyols are generally chosen from aliphatic and aromatic polyether polyols and mixtures of these compounds. Their average molecular mass is preferably between 200 and 9000 and their hydroxyl functionality is preferably between 2 and 4.6.

Mention may be made, as examples of aliphatic polyether polyols, of oxyalkylated derivatives of diols, such as polypropylene glycols, or of triols, such as glycerol, trimethylolpropane and hexane-1,2,6-triol, polymers of ethylene, propylene or butylene oxide, copolymers of ethylene oxide and of propylene oxide, the abovementioned compounds containing silanyl endings, and oxyalkylated diphenyl derivatives, such as derivatives oxyethylenated or oxypropylenated in the 4,4'-position of diphenylmethane.

Use is preferably made of oxypropylated derivatives of glycerol, polymers of propylene or butylene oxide, and copolymers of ethylene oxide and of propylene oxide.

The polyester polyols are generally chosen from aliphatic and aromatic polyester polyols and mixtures of these compounds. Their average molecular mass is preferably between 250 and 7000 and their hydroxyl functionality is preferably between 2 and 3.

Mention may be made, by way of examples, of polyester polyols resulting from the condensation of aliphatic, cyclic or aromatic polyols, such as ethanediol, 1,2-propanediol, 1,3-propanediol, glycerol, trimethylolpropane, 1,6-hexanediol, 1,2,6-hexanetriol, butenediol, sucrose, glucose, sorbitol, pentaerythritol, mannitol, triethanolamine, N-methyidimethanolamine and mixtures of these compounds, with an acid, such as 1,6-hexanedioic acid, dodecanedioic acid, azelaic acid, sebacic acid, adipic acid, 1,18-octadecanedioic acid, phthalic acid, succinic acid and mixtures of these acids, an unsaturated anhydride, such as maleic or phthalic anhydride, or a lactone, such as caprolactone.

Use is preferably made of the polyester polyols resulting from the condensation of ethanediol, 1,3-propanediol and/or 1,6-hexanediol with adipic acid and/or phthalic acid.

The unsaturated polyols are generally chosen from polyols and mixtures of polyols preferably having a molecular mass of between 1200 and 3000.

Mention may be made, by way of examples, of polybutadiene and polyisoprene containing hydroxylated endings. The abovementioned polyols are advantageously amorphous.

The abovementioned polyols can also be used as a mixture with other hydroxylated compounds.

It is thus possible to use a monol or a mixture of monols, in particular poly(ethylene/butylene)monols, such as Kraton Liquid™ L-1203 Polymer, sold by the company Shell, or a polyol or a mixture of polyols chosen from poly(ethylene/butylene)diols, such as Kraton Liquid™ polymer HPVM-2203, sold by Shell, copolymers of ethylene, of vinyl acetate and of 2-hydroxyethyl acrylate, such as Orevac® 9402, sold by Elf Atochem, indene/coumarone resins modified by phenol, for example Novares CA120, sold by VFT, and hydroxylated tackifying resins, for example Reagem, sold by DRT.

The abovementioned monol and the abovementioned polyol respectively represent 0 to 10% and 0 to 25% by weight of the polyols.

The isocyanate belongs to the group composed of:

diisocyanates trimerized as isocyanurates which derive from diisocyanates chosen from the group composed of diphenylmethane 4,4'-diisocyanate, diphenylmethane 2,4'-diisocyanate, hydrogenation products of the abovementioned diisocyanates, toluylene 2,4-diisocyanate, toluylene. 2,6-diisocyanate, hexamethylene diisocyanate, isophorone diisocyanate, naphthylene 1,5-diisocyanate and their mixtures;

and reaction products of diisocyanates with water, such as, for example, the reaction product of toluene diisocyanate or hexamethylene diisocyanate with water (the latter being sold under the name Desmodur®N by Bayer), and their mixtures.

A trimerized hexamethylene diisocyanate or a trimerized isophorone diisocyanate is preferred.

The isocyanate generally contains less than 0.2% by weight of free isocyanate monomers.

The polyurethane prepolymer preferably exhibits a content of isocyanate groups of between 2 and 15% by weight.

The moisture-crosslinkable hot-melt adhesive according to the invention can comprise conventional additives known to a person skilled in the art, such as fillers, tackifying agents, plasticizers, adhesion promoters, such as compounds containing silanyl groups, and catalysts which accelerate the crosslinking by moisture, for example metal catalysts, such as dibutyltin dilaurate, or amine-containing catalysts, such as dimorpholinodiethyl ether.

The moisture-crosslinkable polyurethane adhesives according to the invention can be prepared by reacting the polyols and, if appropriate, the other hydroxylated compounds, optionally dehydrated at high temperature under vacuum, with the isocyanurates with the exclusion of moisture and, if appropriate, under a protective gas, at a temperature which can vary from 90 to 120° C., until the desired content of isocyanate groups is obtained. The optional additives are added, by mixing, to the adhesive thus obtained.

The moisture-crosslinkable hot-melt adhesives according to the invention are particularly suited to the industrial adhesive bonding of textile meshes, for example made of cellulose, of polyamide or of poly(ethylene terephthalate), and of plastic films, for example made of polyethylene, of polypropylene or of poly(ethylene terephthalate). This industrial adhesive bonding operates at a high rate, that is to say at a speed which can exceed 150 metres per minute, or indeed more.

The adhesives according to the invention, in addition, exhibit a content of free isocyanate monomer of less than 0.15% by weight of the polyurethane prepolymer, a low vapour pressure at the temperature of use (100 to 130° C.) and, consequently, a limited toxic nature, an excellent ability to fix materials (trapping power) and a satisfactory elasticity after crosslinking by moisture.

The following examples allow the invention to be illustrated.

EXAMPLE 1

The following compounds are introduced into a reactor under a nitrogen atmosphere:

58.8 parts by weight of hexamethylene diisocyanate isocyanurate (NCO content: 21.6±0.3%; Brookfield viscosity: 3250±750 mPa×s at 23° C.; free hexamethylene diisocyanate: <0.2% by weight; trade name: Desmodur® N3300-Bayer), 41.15 parts by weight of the condensation product of adipic acid and of a mixture of 2,2-dimethyl-1,3-propanediol, 1,2-ethanediol and 1,6-hexanediol (aliphatic polyester polyol; hydroxyl number: 18–24; molecular mass: 5000; OH functionality: 2; trade name: Dynacoll® 7250-Hüls).

The mixture is brought to a temperature of the order of 95 to 100° C.

After completion of the reaction, 0.05 part by weight of dibutyltin dilaurate (DBTL) is introduced. A clear adhesive is recovered which is very viscous at 23° C., which has an NCO content equal to 11.5%, measured according to AFNOR Standard T52-132, and a Brookfield viscosity at 85° C. equal to 2900 mpa×s, and which, on cooling, exhibits a low elasticity.

The mechanical properties of the adhesive obtained are defined by the tensile strength and the elongation at break, measured under the conditions hereinbelow.

The molten adhesive is poured at 100° C. onto silicone paper using a film drawer preheated to 100° C., in order to form a film with a length of 25 cm, a width of 9 cm and a thickness of 300 mm. The film is subjected to a temperature of 23° C. and a relative humidity of 50% until polymerization is complete (of the order of 4 weeks).

After having removed the silicone paper, the film is cut up with a hollow punch in order to form test specimens (H2 type-AFNOR Standard T46002) which are subjected to tension with a test machine (Type DY 30; Adamel-L'Homargy) at a constant speed of 100 mm/min. The measurements are carried out on 5 test specimens.

Tensile strength: 12.6±1.5 MPa

Elongation at break: 35±4%

The adhesive is used for carrying out the industrial lamination of a polyamide textile mesh (25 g/m$^2$) on a polyethylene film. The molten adhesive at 100° C. is deposited by means of a lip nozzle on the film which progresses at the speed of 175 meters per minute. The weight per unit area of the adhesive is approximately 4 g/m$^2$. The textile mesh is subsequently deposited on the film and the assembly is calendered and wound off. The peel value of the assembly after polymerizing for 1 and 4 weeks (23° C. and 50% relative humidity) is measured under the following conditions:

The assembly is cut into strips with a width of 25 mm and the outer polyethylene face is reinforced with an adhesive tape. The strips obtained are subjected to a 1800 peel tension at a constant speed of 500 mm/min (Type DY 30 test machine; Adamel-L'Homargy). The measurements are carried out on 5 strips.

The peel strength is equal to 2.5 N/25 mm (1 week) and 5 N/25 mm (4 weeks).

EXAMPLE 2

The preparation is carried out under the conditions of Example 1, modified in that 30 parts by weight of Desmodur® N3300, 25 parts by weight of Dynacolle 7250, 45 parts by weight of Dynacoll® 7130 and 0.01 part by weight of DBTL are used.

Dynacoll® 7130 is the condensation product of a mixture of 1,3-benzenedicarboxylic acid and adipic acid and of a mixture of 1,4-benzenedicarboxylate, 2,2-dimethyl-1,3-propanediol, 1,2-ethanediol and 3-hydroxy-2,2-dimethylpropyl 3-hydroxy-2,2-dimethylpropanoate (aliphatic/aromatic polyester polyol; hydroxyl number: 31–39; molecular mass: 3000; OH functionality: 2; sold by Hüls).

A white adhesive is recovered which is solid at 23° C. and which has an NCO content equal to 5.04%.

At 130° C., the adhesive is a white liquid, with a Brookfield viscosity equal to 25,800 mpa×s, which exhibits a sufficient tackiness to adhere to a plastic film. On cooling, the adhesive exhibits high elasticity.

The adhesive exhibits:

a tensile strength equal to 10.8±2.3 MPa an elongation at break equal to 359±49%.

The peel strength of the film obtained under the industrial conditions of Example 1 is equal to 5 N/25 mm (4 weeks).

EXAMPLE 3

The following compounds are introduced into a reactor under a nitrogen atmosphere:

29.9 parts by weight of hexamethylene diisocyanate isocyanurate (NCO content: 21.6±0.3%; Brookfield viscosity: 3250±750 mPa.s at 23° C.; free hexamethylene diisocyanate: <0.2% by weight; trade name: Desmodur® N3300-BAYER), 25.2 parts by weight of the condensation product of a mixture of isophtalic acid, terephtalic acid and adipic acid and of a mixture of 2,2-dimethyl-1,3-propanediol, ethylene glycol and 1,6-hexanediol (aliphatic polyester polyol; hydroxyl number: 27–34; molecular mass: 3500; OH functionality: 2; Tg −30° C.; trade name: Dynacoll® 7230-HÜLS), 44.9 parts by weight of a copolymer of ethylene oxide and propylene oxide (polyether polyol; molecular mass: 3800; OH functionality: 2; trade name: Voranol® EP 1900-DOW CHEMICALS).

The mixture is brought to a temperature of the order of 85 to 90° C.

After 5 hours of reaction, 0.05 part by weight of dibutyltin dilaurate (DBTL) is introduced. After the completion of the reaction, 0.05 part by weight of DBTL is introduced again. A viscous adhesive is recovered which has a NCO content equal to 5%, mesured according to AFNOR Standard T52-132, and a Brookfield viscosity at 85° C. equal to 2200 mPa.s.

The adhesive thus obtained is used satisfactorily for producing an assembly polyethylene film/textile mesh by depositing the molten adhesive on the film which progresses at a speed greater than 100 metres per minute, subsequent depositing of the textile mesh, calendering and winding.

What is claimed is:

1. A method for bonding comprising adhesively bonding fastening elements with a moisture-crosslinkable hot-melt adhesive, said moisture-crosslinkable hot-melt adhesive comprising a polyurethane polyaddition prepolymer of at least one polyol and at least one isocyanate comprising a diisocyanate trimerized as an isocyanurate or a reaction product of a diisocyanate with water, said prepolymer having a content of free NCO groups of between 1 and 25% by weight, wherein the adhesive consists essentially of the polyurethane polyaddition prepolymer and optionally one or more of a filler, tackifying agent, plasticizer, adhesion promoter, or catalyst.

2. The method according to claim 1, wherein the content of free NCO groups is between 2 and 15% by weight.

3. The method according to claim 1, wherein the isocyanate is a diisocyanate trimerized as isocyanurate which derives from a diisocyanate comprising diphenylmethane 4,4'-diisocyanate, diphenylmethane 2,4'-diisocyanate, a hydrogenation product of the abovementioned diisocyanates, toluylene 2,4-diisocyanate, toluylene 2,6-diisocyanate, hexamethylene diisocyanate, isophorone diisocyanate, naphthylene 1,5-diisocyanate or their mixtures.

4. The method according to claim 1, wherein the isocyanate is trimerized hexamethylene diisocyanate or trimerized isophorone diisocyanate.

5. The method according to claim 1, wherein the polyol is a polyether polyol, a polyester polyol or an unsaturated polyol.

6. The method according to claim 1, wherein the polyol is a polyester polyol having an average molecular mass of between 250 and 7,000 and an OH functionality of between 2 and 3.

7. The method according to claim 5, wherein the polyester polyol is a condensation product of ethanediol, 1,2-propanediol, 1,3-propanediol, glycerol, trimethylolpropane, 1,6-hexanediol, 1,2,6-hexanetriol, butenediol, sucrose, glucose, sorbitol, pentaerythritol, mannitol, triethanolamine, N-methyldimethanolamine or mixtures of these compounds with an acid, an unsaturated anhydride, or a lactone.

8. The method according to claim 7, wherein the polyester polyol is a condensation product of at least one of ethanediol, 1,3-propanediol and 1,6-hexanediol with at least one of adipic acid and-phthalic acid.

9. A method for adhesive bonding of a fixing component comprising a textile mesh comprising a multitude of fine loops and a plastic film, comprising applying an adhesive to said fixing component and adhesively bonding said fixing component to an article intended for hygiene, said adhesive comprising a polyurethane polyaddition prepolymer of at least one polyol and at least one isocyanate comprising a diisocyanate trimerized as an isocyanurate or a reaction product of a diisocyanate with water, said prepolymer having a content of free NCO groups of between 1 and 25% by weight, wherein the adhesive consists essentially of the polyurethane polyaddition prepolymer and optionally one or more of a filler, tackifying agent, plasticizer, adhesion promoter, or catalyst.

10. The method according to claim 9, wherein the textile mesh comprises cellulose, polyamide or poly(ethylene terephthalate).

11. The method according to claim 9, wherein the plastic film comprises polyethylene, polypropylene or poly(ethylene terephthalate).

12. An article intended for hygiene comprising a fixing component comprising a textile mesh adhesively bonded to said article with an adhesive, said adhesive comprising a polyurethane polyaddition prepolymer of at least one polyol and at least one isocyanate comprising a diisocyanate trimerized as an isocyanurate or a reaction product of a diisocyanate with water, said prepolymer having a content of free NCO groups of between 1 and 25% by weight, wherein the adhesive consists essentially of the polyurethane polyaddition prepolymer and optionally one or more of a filler, tackifying agent, plasticizer, adhesion promoter, or catalyst.

13. The method according to claim 7, wherein said acid is 1,6-hexanedioic acid, dodecanedioic acid, azelaic acid, sebacic acid, adipic acid, 1,18-octadecanedioic acid, phthalic acid, succinic acid or mixtures of these acids.

14. The method according to claim 7, wherein said unsaturated anhydride is maleic or phthalic anhydride.

15. The method according to claim 7, wherein said lactone is caprolactone.

16. An article intended for hygiene comprising fastening elements, said fastening elements comprising a textile mesh, said textile mesh comprising fine loops and a plastic film bonded with a moisture-crosslinkable hot-melt adhesive comprising a polyurethane polyaddition prepolymer of at least one polyol and at least one isocyanate comprising a diisocyanate trimerized as an isocyanurate or a reaction product of a diisocyanate with water, said prepolymer having a content of free NCO groups of between 1 and 25% by weight, wherein the adhesive consists essentially of the polyurethane polyaddition prepolymer and optionally one or more of a filler, tackifying agent, plasticizer, adhesion promoter, or catalyst.

* * * * *